(12) United States Patent
Siong

(10) Patent No.: US 8,182,187 B2
(45) Date of Patent: May 22, 2012

(54) DRIVE SYSTEM

(75) Inventor: Phua Cheng Siong, Singapore (SG)

(73) Assignee: Asia Fastening (US), Inc., Wilmington, DE (US)

( * ) Notice: Subject to any disclaimer, the term of this patent is extended or adjusted under 35 U.S.C. 154(b) by 289 days.

(21) Appl. No.: 12/427,522

(22) Filed: Apr. 21, 2009

(65) Prior Publication Data

US 2009/0260489 A1    Oct. 22, 2009

Related U.S. Application Data

(60) Provisional application No. 61/046,668, filed on Apr. 21, 2008.

(51) Int. Cl.
 *F16B 35/06* (2006.01)
 *B25B 15/00* (2006.01)
(52) U.S. Cl. ............. 411/404; 411/919; 81/436; 81/460
(58) Field of Classification Search .................... 81/436, 81/460; 411/402–404, 407, 408, 410, 919
 See application file for complete search history.

(56) References Cited

U.S. PATENT DOCUMENTS

| | | | |
|---|---|---|---|
| 276,135 A | 4/1883 | Cooley |
| 755,804 A | 3/1904 | Smith |
| 846,981 A | 3/1907 | Clairborne |
| 1,080,707 A | 12/1913 | Mackie et al. |
| 1,894,034 A | 1/1933 | Fieg |
| 2,066,484 A | 1/1935 | Phillips |
| 2,046,837 A | 7/1936 | Phillips |
| 2,140,449 A | 12/1938 | Brown |
| 2,248,695 A | 7/1941 | Bradshaw |
| 2,285,460 A | 6/1942 | Purtell |
| 2,362,999 A | 11/1944 | Hewitt |
| 2,397,216 A | 3/1946 | Stellin |
| 2,445,978 A | 7/1948 | Stellin |
| 2,474,994 A | 7/1949 | Tomalis |
| RE24,878 E | 9/1960 | Smith et al. |
| 2,993,950 A | 7/1961 | Forman |
| 3,028,781 A | 4/1962 | Muenchinger |
| 3,122,963 A | 3/1964 | Borgeson |
| 3,170,364 A | 2/1965 | Johnson et al. |
| 3,213,719 A | 10/1965 | Kloack |
| 3,237,506 A | 3/1966 | Muenchinger |

(Continued)

FOREIGN PATENT DOCUMENTS

EP    1205370    5/2002

(Continued)

*Primary Examiner* — Debra S Meislin
(74) *Attorney, Agent, or Firm* — Hahn, Loeser & Parks LLP; Arland T. Stein

(57) ABSTRACT

An article for use in a torque transmitting system which has a drive surface configuration having side and end surfaces is disclosed. The end surface tapers upwardly and outwardly from a lowermost point provided along a longitudinal axis to the side surface. The end surface defines a plurality of identically configured lobes that extend from a first point to a second point. The first point of one lobe is identical to the second point of an adjacent lobe. The first and second points of each lobe are provided along an imaginary circle having its center along the longitudinal axis. Each lobe extends from the first point to the second point by a series of edges that are straight, concave and/or convex. Two of the edges are tangential to the imaginary circle. The side surface extends upwardly from the edges defining the plurality of lobes.

30 Claims, 13 Drawing Sheets

U.S. PATENT DOCUMENTS

| | | | |
|---|---|---|---|
| 3,331,274 A | 7/1967 | Walton |
| 3,369,441 A | 2/1968 | Kosar |
| 3,584,667 A | 6/1971 | Reiland |
| 3,658,105 A | 4/1972 | Burt et al. |
| 3,673,912 A | 7/1972 | Herr |
| 3,763,725 A | 10/1973 | Reiland |
| 3,854,372 A | 12/1974 | Gutshall |
| 3,872,904 A | 3/1975 | Barlow |
| 3,874,258 A | 4/1975 | Semola et al. |
| 3,898,706 A | 8/1975 | Rivalland et al. |
| 3,945,071 A | 3/1976 | Flodin |
| 4,037,514 A | 7/1977 | Lliteras |
| 4,073,160 A | 2/1978 | Perret |
| 4,084,478 A | 4/1978 | Simmons |
| 4,146,073 A | 3/1979 | Lliteras |
| 4,151,621 A | 5/1979 | Simmons |
| 4,171,662 A | 10/1979 | Simone et al. |
| 4,187,892 A | 2/1980 | Simmons |
| 4,191,228 A | 3/1980 | Fenton |
| 4,202,244 A | 5/1980 | Gutshall |
| 4,258,596 A | 3/1981 | Bisbing et al. |
| 4,269,246 A | 5/1981 | Larson et al. |
| 4,572,039 A | 2/1986 | Desjardins |
| 4,613,385 A | 9/1986 | Thomas et al. |
| 4,686,874 A | 8/1987 | McCauley et al. |
| 4,970,922 A | 11/1990 | Krivec |
| 5,033,501 A | 7/1991 | Stehling |
| 5,137,407 A | 8/1992 | Yamamoto |
| 5,171,117 A | 12/1992 | Seidl |
| 5,207,132 A | 5/1993 | Goss et al. |
| 5,237,893 A | 8/1993 | Ryder et al. |
| 5,279,190 A | 1/1994 | Goss et al. |
| 5,291,811 A | 3/1994 | Goss |
| 5,378,101 A | 1/1995 | Olson et al. |
| 5,435,680 A | 7/1995 | Schuster |
| 5,461,952 A | 10/1995 | Goss |
| 5,509,334 A | 4/1996 | Shinjo |
| 5,598,753 A | 2/1997 | Lee |
| 5,868,049 A | 2/1999 | Kanwal |
| 5,957,645 A | 9/1999 | Stacy |
| 6,234,914 B1 | 5/2001 | Stacy |
| 6,314,840 B2 * | 11/2001 | Bozonnet ............... 81/121.1 |
| 6,367,358 B1 | 4/2002 | Stacy |
| 7,073,416 B2 | 7/2006 | Kozak et al. |
| 7,293,949 B2 | 11/2007 | Dilling |
| 2005/0232722 A1 | 10/2005 | Dilling |
| 2006/0078404 A1 | 4/2006 | Dilling |
| 2006/0165511 A1 | 7/2006 | Yamamoto |
| 2007/0214920 A1 | 9/2007 | Dilling |

FOREIGN PATENT DOCUMENTS

| | | |
|---|---|---|
| EP | 1371453 | 12/2003 |
| EP | 1536150 | 6/2005 |
| FR | 1245713 | 11/1960 |
| FR | 1339685 | 10/1963 |
| FR | 1457117 | 1/1967 |
| FR | 2321069 | 3/1977 |
| GB | 1234436 | 6/1971 |
| JP | 2002-364619 | 12/2002 |
| SU | 1249212 | 8/1986 |
| WO | 88/09708 | 12/1988 |
| WO | 99/23389 | 5/1999 |

* cited by examiner

DRIVE SYSTEM

CROSS-REFERENCE AND INCORPORATION BY REFERENCE

This application claims the domestic priority of U.S. Provisional Application Ser. No. 61/046,668, filed on Apr. 21, 2008, and entitled "Tapered Recess Drive System". U.S. Provisional Application Ser. No. 61/046,668 is hereby incorporated by reference in its entirety.

BACKGROUND

This disclosure relates to an improved drive system wherein a first component applies a driving torque to a second component, such as for example a threaded fastener and driver combination, including miniature versions thereof.

The miniature fasteners used in several different types of products, such as Hard Disk Drive (HDD), note books, digital cameras and mobile phones, are significant and they are an important factor in overall productivity, quality and profitability. The drive system on these critical fasteners affects assembly speed, downtime, and the amount of scrapped components.

Prior art includes the following:

EP 1 536 150 discloses a screw tightening construction, as well as a screw and screw lightening tool. Specifically, in a threaded fastener wrenching structure, an inclination angle ($\alpha$) of an arcuate portion of a fitting protrusion is larger than an inclination angle ($\beta$) of an arcuate portion of a recess and a wrenching torque is transmitted through an intermediate portion of the fitting protrusion in an axial direction engaged with an opening edge of the recess. As a result, a diameter dimension of an engaged part is larger than that in the intermediate of the recess engaged with a tip portion of the fitting protrusion in a case of $\alpha<\beta$ and a smaller force is applied by a constant wrenching torque to the engaged part in inverse proportion to the larger diameter dimension. According to the patent, this restrains a partial damage or a deformation of the fitting protrusion and the recess at the engaged part or allows a small diameter threaded fastener to be efficiently wrenched by higher wrenching torque. A smaller applied force to the engaged part causes a stably wrenched state of the small diameter threaded fastener as a result of a small component force in the axial direction to force apart along an inclination of the arcuate portion, namely, restraining a bit from coming out of the recess.

U.S. Pat. No. 5,598,753 discloses an eagle wing tips tamper-proof fastener and drive tool with complementary driver head contact. A conventional threaded shank is perpendicularly connected to a substantially flat head. The head comprises a plurality of recessed channels numbering three and the channels radially curve outwards from a common center point. In one embodiment, the substantially vertical right and left walls of each channel allow application of torque with the drive tool in both directions. In an alternate embodiment, the substantially vertical right wall and the surface of the substantially inclined left wall allow application of torque with the drive tool to the right only.

U.S. Pat. Nos. 5,957,645, 6,234,914 and 6,367,358 disclose a spiral drive system for threaded fasteners that include driver-engageable surfaces on the head end of the fastener in which at least some of the driver-engageable surfaces are defined by a spiral segment. According to the patents, the driver-engageable surfaces are configured to maximize torque transmission while spreading the driving load over a broad driver-fastener interface to reduce the risk of development of high stress regions. The patents also disclose drivers and related tooling.

U.S. Pat. Nos. 3,122,963 and 3,658,105 also disclose screws having a recess formed in the head.

BRIEF SUMMARY

An article of manufacture for use in a drive system having a longitudinal axis is disclosed. The article of manufacture comprises a drive surface configuration having a side surface and an end surface. The end surface tapers upwardly and outwardly from a lowermost point provided along the longitudinal axis to the side surface. The end surface defines a plurality of identically configured lobes. Each lobe extends from a first point to a second point. The first point of one of the plurality of lobes is the second point of an adjacent one of the plurality of lobes. Each of the first and second points of each lobe is provided along an imaginary circle having its center along the longitudinal axis. The side surface extends upwardly from the edges defining the plurality of lobes.

In a first preferred embodiment, each of the lobes extends from the first point to the second point by, in series, a straight edge, first and second concave edges, and a convex edge. The straight edge and the convex edge each are tangential to the imaginary circle.

In a second preferred embodiment, each of the lobes extends from the first point to the second point by, in series, a first convex edge, a straight edge, first and second concave edges, and a second concave edge. The first and second convex edges are each tangential to the imaginary circle. The first convex edge of one of the lobes is an extension of the second convex edge of an adjacent one of the lobes.

The article of manufacture may be a fastener or a drive tool. The drive surface configuration may be either internally configured, such as by a recess, or externally configured. If the internally configured drive surface is provided in the fastener, then the drive tool would preferably have a complementary externally configured drive surface such that the drive tool can be operated to install and/or uninstall the fastener. Conversely, if the internally configured drive surface is provided in the drive tool, then the fastener would preferably have a complementary externally configured drive surface such that the drive tool can be operated to install and/or uninstall the fastener.

The article of manufacture may also be a tool, such as a punch, for forming the internally configured drive surface in an appropriate component, such as a fastener or a drive tool.

BRIEF DESCRIPTION OF THE DRAWINGS

For a more complete understanding of the disclosure, reference may be made to the following detailed description and accompanying drawings wherein like reference numerals identify like elements in which.

DETAILED DESCRIPTION

Figure 1:
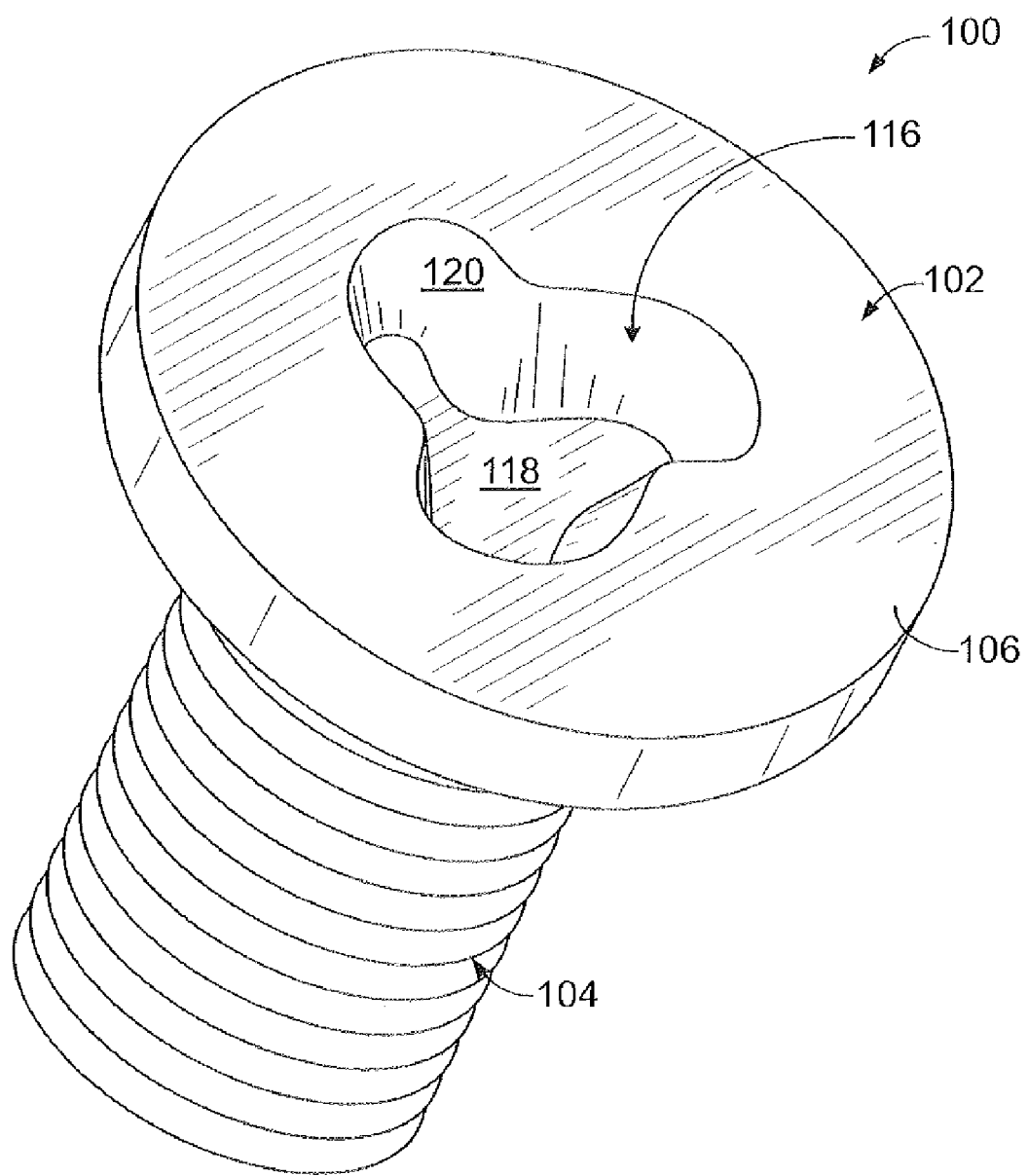
FIG. 1 is a perspective view of a first described embodiment of a fastener having internally configured drive surfaces defining a recess of the fastener.

While the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claims.

With respect to the fastener and drive tool arrangements to be discussed hereinafter, the drawings illustrate particular applications wherein the fastener is provided with a recess or socket having an internal configuration while the complementary externally shaped component is in the form of a drive tool. Those skilled in the art will readily realize that this situation could be reversed in that the fastener could employ the external configuration while the drive tool would be in the form of a socket type element having a complementary internal configuration. Furthermore, while the present disclosure describes a fastener drive system, it is to be noted that the drive system may be used in any torque transmission or torque coupling application, wherein a drive unit is employed to transmit torque to a complementary shaped driven unit.

The disclosure describes first and second preferred embodiments of fastener and drive tool arrangements. The first preferred embodiment will be described with reference to FIGS. 1-14C with reference numerals being in the one, two and three hundreds. The second preferred embodiment will be described with reference to FIGS. 15-20 with reference numerals being in the four, five and six hundreds.

Directing attention to FIGS. 1-11, there is illustrated a first preferred embodiment of a fastener and drive tool arrangement, which is a miniature fastener and drive tool arrangement. The fastener of the first preferred embodiment is designated generally 100, and includes a head 102 and an elongated shank 104. The head 102 has upper and lower surfaces 106, 108, both of which are preferably substantially flat, circular and generally parallel to one another. The shank 104 extends outwardly from the lower surface 108 of the head 102 to a free end 110 thereof such that the length of the fastener 100 is defined as a straight distance between the upper surface 106 and the free end 110. The shank 104 has a first portion 112 which is preferably cylindrical in configuration and which preferably has an external thread. The external thread is preferably M0.4 and above, and more preferably between M0.6 and M2.0, although obviously the external thread can be any other desired size. The first portion 112 is preferably provided about a longitudinal, central axis Z-Z, which is preferably perpendicular to the upper and lower surfaces 106, 108 of the head 102. The shank 104 also has a second portion 114 that connects the first portion 112 to the lower surface 108 of the head 102. The second portion 114 preferably tapers and/or curves outwardly from the first portion 112 to the lower surface 108 of the head 102 such that the shank 104 has a larger diameter at the connection of the second portion 114 to the lower surface 108 of the head 102 than at the connection of the second portion 114 to the first portion 112. Of course, it is to be understood that the second portion 114 may extend straight upwardly from the first portion 112 to the lower surface 108 of the head 102, or that the second portion 114 may taper and/or curve inwardly from the first portion 112 to the lower surface 108 of the head 102. The second portion 114 is preferably not threaded, but may be partly or wholly threaded if desired. The configuration of the second portion 114 is generally dependent on one or more of the size of the external thread of the first portion 112 of the shank 104, and the diameter and thickness of the head 102. The diameter and thickness of the head 102 is generally dependent on the size of the external thread of the first portion 112 of the shank 104.

Figure 2:
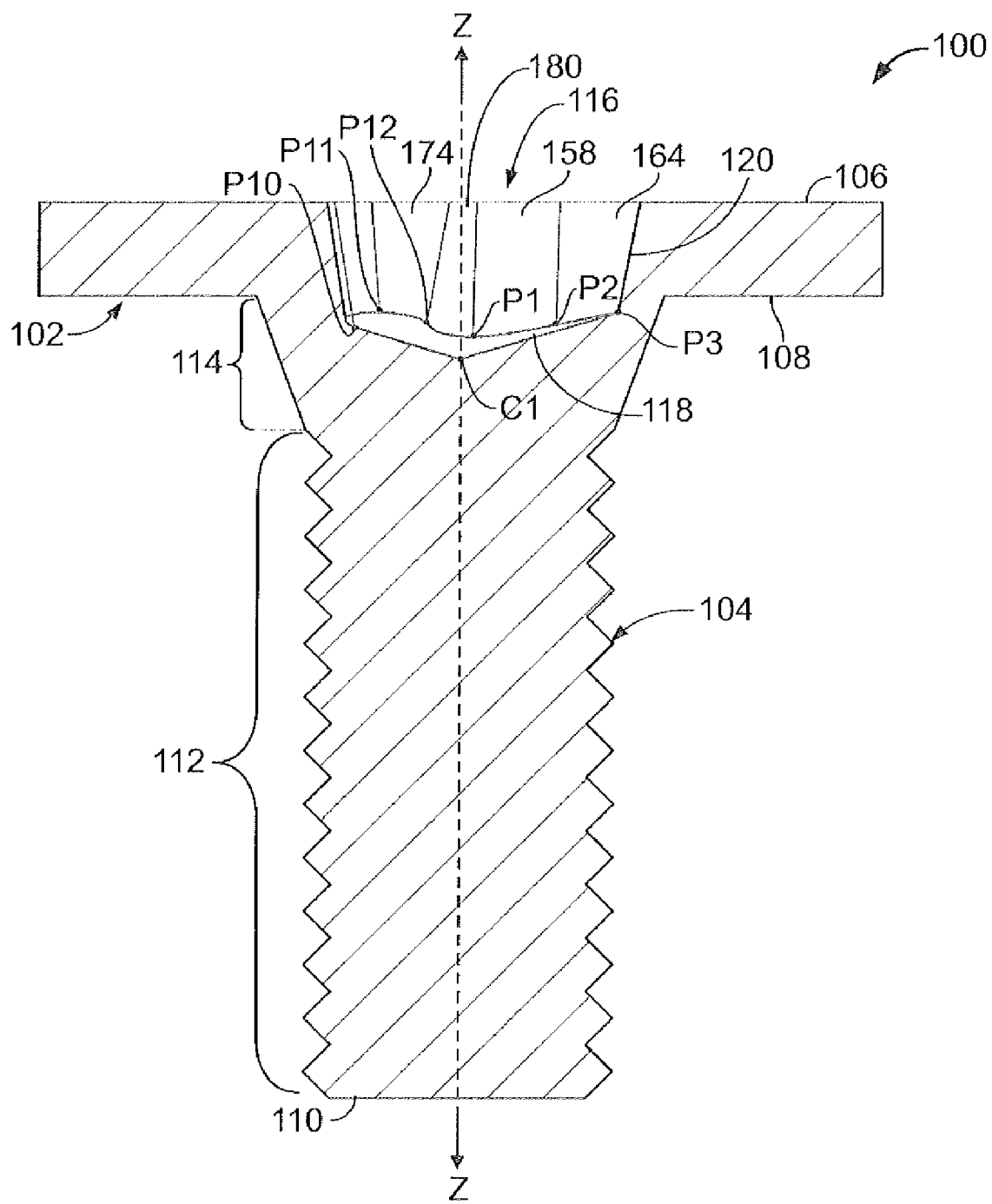
FIG. 2 is a cross-sectional view of the fastener illustrated in FIG. 1 taken along line 2-2 of FIG. 3.
Figure 3:
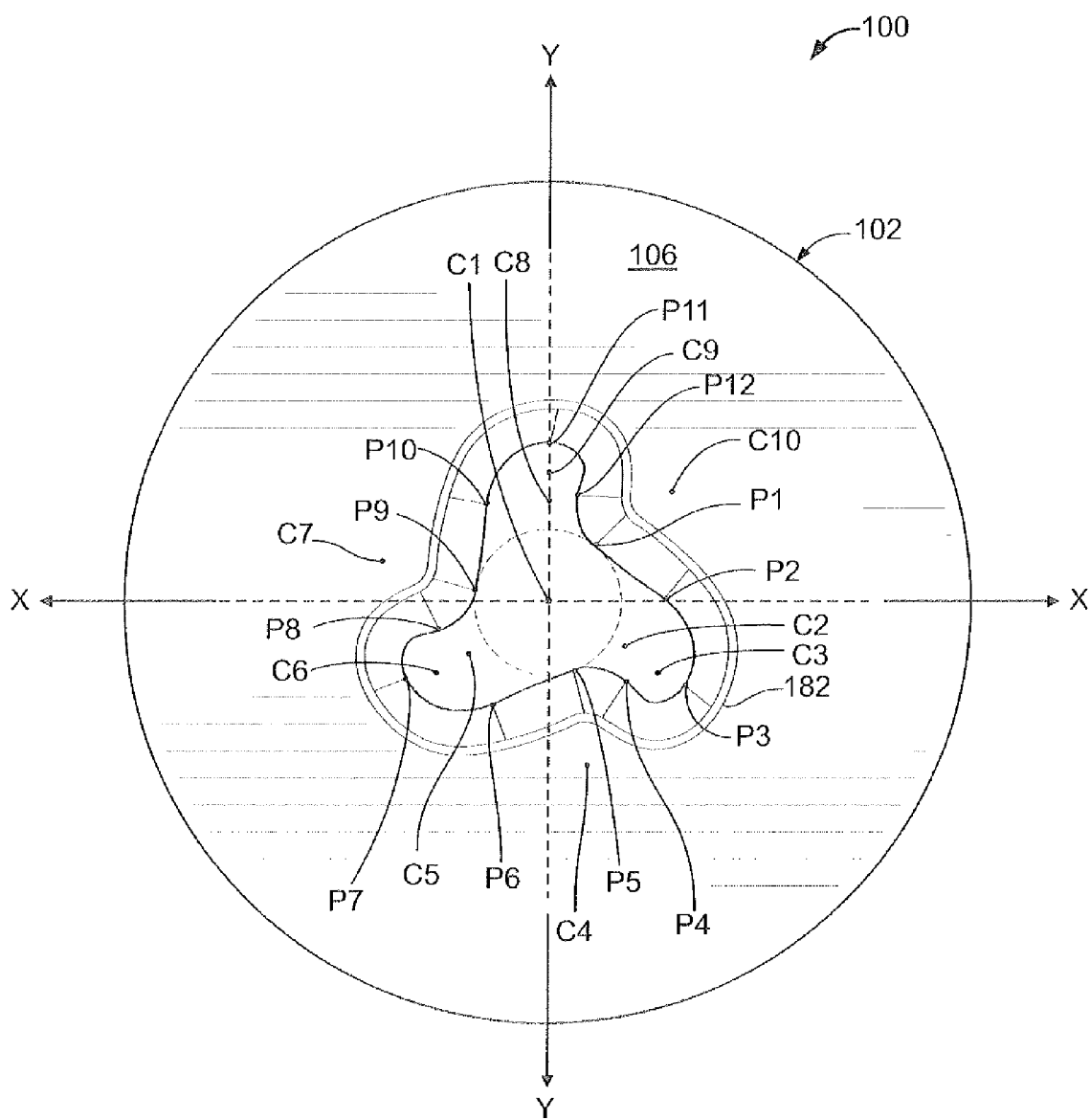
FIGS. 3 and 4 are identical top views of the fastener illustrated in FIG. 1.
Figure 4:
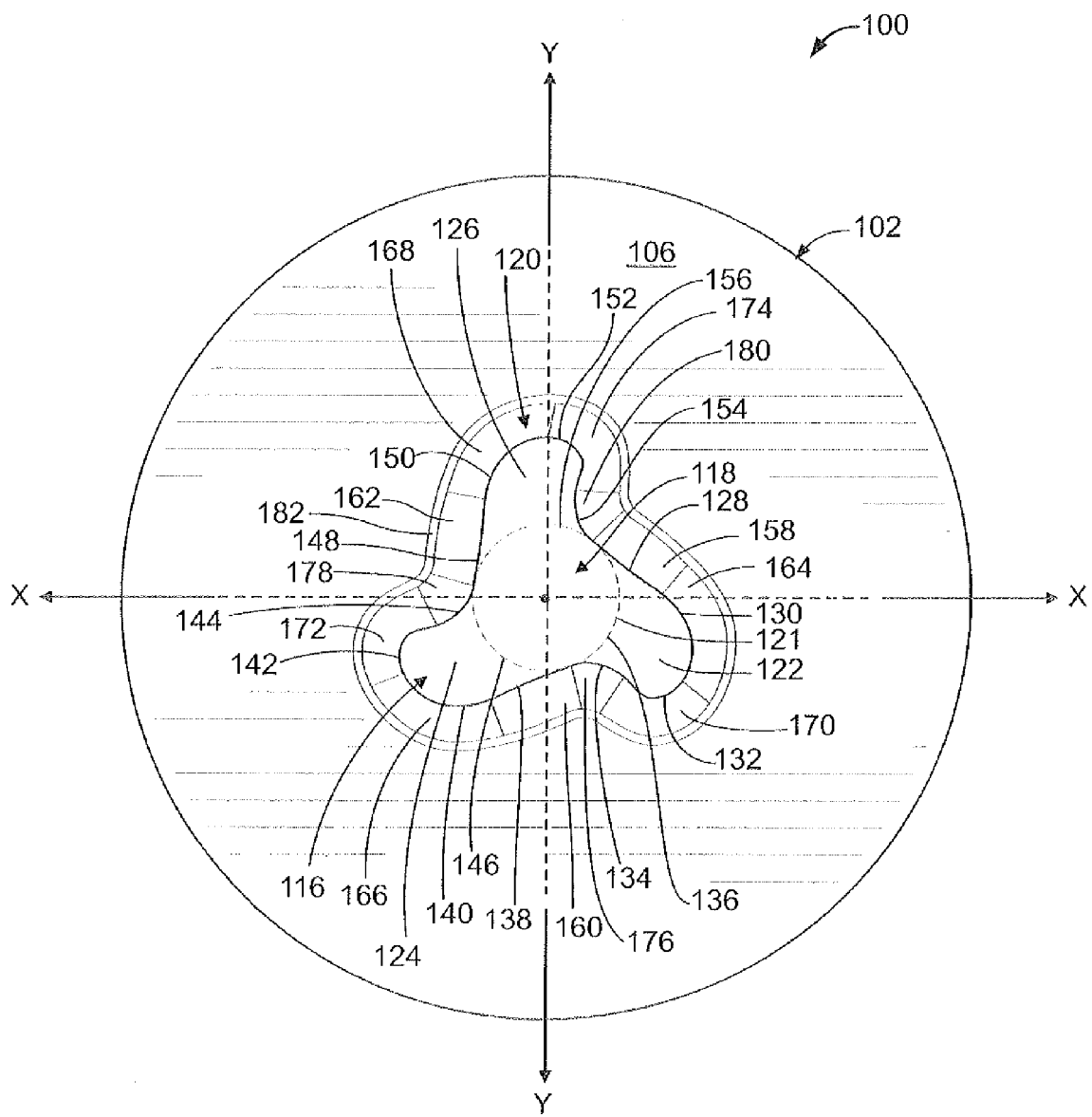
Figure 5:
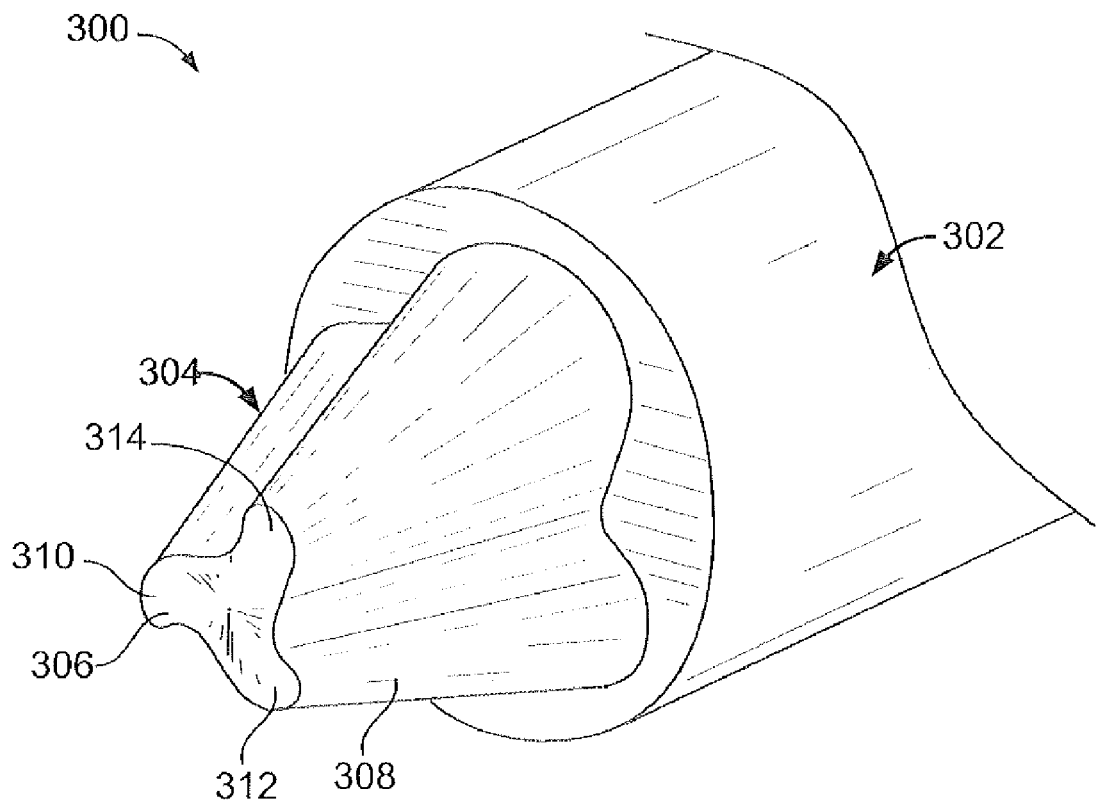
FIG. 5 is a perspective view of a first described embodiment of a drive tool having externally configured drive surfaces.
Figure 6:
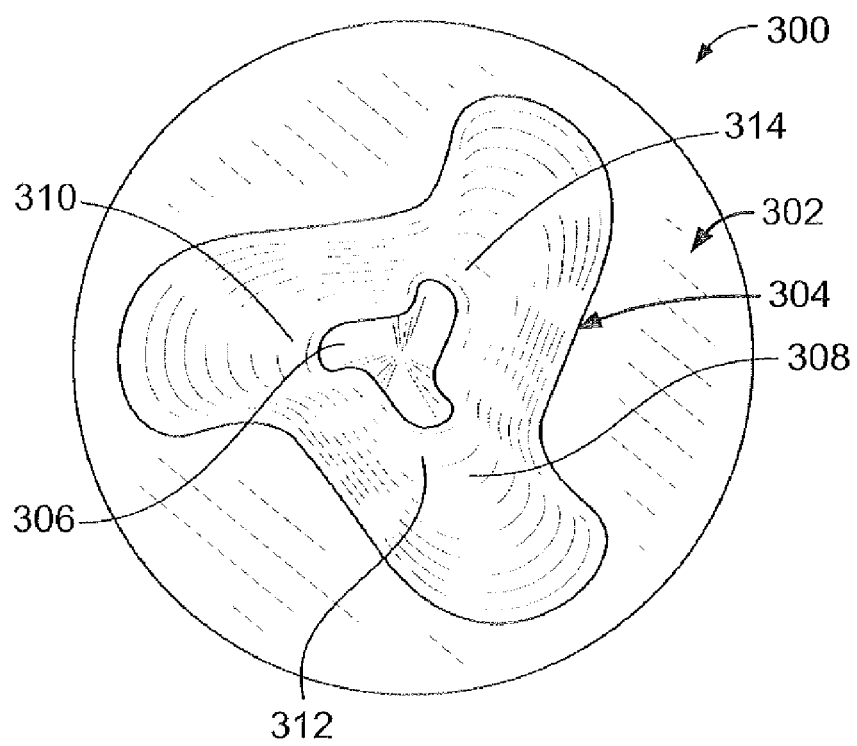
FIG. 6 is an end view of the drive tool illustrated in FIG. 5.
Figure 7:
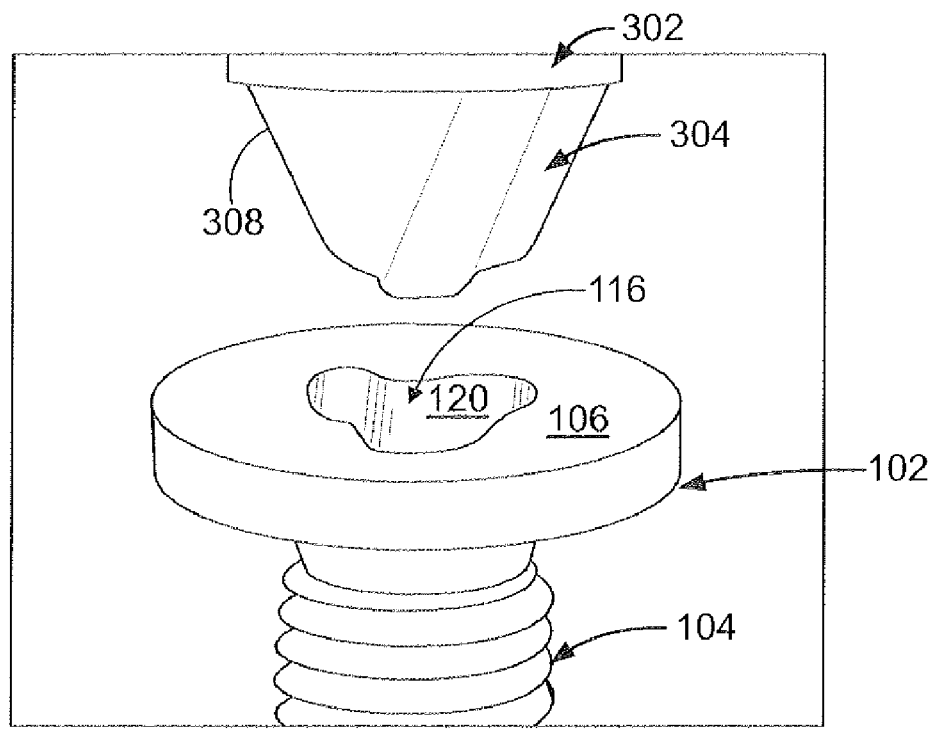
FIG. 7 is a perspective view of the fastener illustrated in FIG. 1 and the drive tool of FIG. 5.

A recess or socket 116 is formed in the fastener 100 through the upper surface 106 of the head 102. The recess 116 defines internally configured drive surfaces, namely a bottom surface (alternatively referred to as a base surface or an end surface) 118 and a recess wall (alternatively referred to as a side surface) 120 that extends upwardly from the bottom surface 118 to the upper surface 106 of the head 102. The bottom surface 118 has a center point C1 which is preferably provided along the longitudinal axis Z-Z, as illustrated in FIG. 2. The center point C1 is also provided along an axis X-X and along an axis Y-Y, as illustrated in FIG. 3. The center point C1 is provided at the deepest portion of the recess 116 with respect to the upper surface 106 of the head 102. The bottom surface 118 preferably tapers upwardly and outwardly from the center point C1 to the recess wall 120. The bottom surface 118 has a center portion 121 and preferably has first, second and third channel portions or lobes 122, 124, 126, each of which are preferably identical in configuration to one another. The center portion 121 is preferably circular in configuration with the center point C1 being the center thereof, and is illustrated in dashed line (see FIGS. 3 and 4) as the boundaries of the center portion 121 are imaginary.

The first channel portion or lobe 122 is defined by a straight edge 128, a first curved edge 130, a second curved edge 132, a third curved edge 134, and an imaginary arc 136 defined by the circular center portion 121. The straight edge 128 extends from a point P1 to a point P2. The first curved edge 130 extends from the point P2 to a point P3. The second curved edge 132 extends from the point P3 to a point P4. The third curved edge 134 extends horn the point P4 to a point P5. The arc 136 defined by the circular center portion 121 extends from point P5 to point P1 such that the circular center portion 121 is tangential to points P1 and P5.

The second channel portion or lobe 124 is preferably formed in an identical manner as the first channel portion or lobe 122 such that the second channel portion 124 is defined by a straight edge 138, a first curved edge 140, a second curved edge 142, a third curved edge 144, and an imaginary arc 146 defined by the circular center portion 121. The straight edge 138 extends from the point P5 to a point P6. The first curved edge 140 extends from the point P6 to a point P7. The second curved edge 142 extends from the point P7 to a point P8. The third curved edge 144 extends from the point P8 to a point P9. The arc 146 defined by the circular center portion 121 extends from point P9 to point P5 such that the circular center portion 121 is tangential to points P5 and P9.

The third channel portion or lobe 126 is also preferably formed in an identical manner as the first channel portion or lobe 122 such that the third channel portion 126 is defined by a straight edge 148, a first curved edge 150, a second curved edge 152, a third curved edge 154, and an imaginary arc 156 defined by the circular center portion 121. The straight edge 148 extends from the point P9 to a point Pit). The first curved edge 150 extends from the point P10 to a point P11. The second curved edge 152 extends from the point P11 to a point P12. The third curved edge 154 extends from the point P12 to the point P1. The arc 156 defined by the circular center portion 121 extends from point P1 to point P9 such that the circular center portion 121 is tangential to points P1 and P9.

The positioning of points P1, P2, P3, P4 and P5 are provided relative to center point C1, namely at the intersection of the axes X-X, Y-Y and Z-Z, as illustrated in FIGS. 2 and 3. Point P1 is provided approximately 0.1084 millimeters above the X-X axis (See FIG. 3), approximately 0.1188 millimeters to the right of the Y-Y axis (see FIG. 3), and approximately 0.0481 millimeters above the center point C1 (see FIG. 2) (toward the upper surface 106 of the head 102). Point P2 is provided approximately 0.0369 millimeters above the X-X axis, approximately 0.2453 millimeters to the right of the Y-Y axis, and approximately 0.0742 millimeters above the center point C1. Point P3 is provided approximately 0.1841 millimeters below the X-X axis, approximately 0.3031 millimeters to the right of the Y-Y axis, and approximately 0.1000 millimeters above the center point C1. Point P4 is provided approximately 0.1750 millimeters below the X-X axis, approximately 0.1810 millimeters to the right of the Y-Y axis, and approximately 0.0762 millimeters above the center point C1. Point P5 is provided approximately 0.1571 millimeters below the X-X axis, approximately 0.0345 millimeters to the right of the Y-Y axis, and approximately 0.0481 millimeters above the center point C1.

Points P1, P5 and P9 are all planar to one another and are preferably separated from one another by 120 degrees. Arc 136 connecting points P1, P5, arc 146 connecting points P5, P9, and arc 156 connecting points P9, P1 form the circular center portion 121. Points P2, P6 and P10 are all planar to one another and are separated from one another by 120 degrees. Points P3, P7 and P11 are all planar to one another and are separated from one another by 120 degrees. Points P4, P8 and P12 are all planar to one another and are separated from one another by 120 degrees.

The first curved edges 130, 140, 150 are defined as arcs of imaginary circles having their centers at points C2, C5 and C8 with each of the imaginary circles preferably having a radius of approximately 0.1546 millimeters. The first curved edges 130, 140, 150 are concave relative to the center point C1 (see FIG. 4). The second curved edges 132, 142, 152 are defined as arcs of imaginary circles having their centers at points C3, C6 and C9 with the imaginary circles preferably having a radius of approximately 0.0741 millimeters. The second curved edges 132, 142, 152 are concave relative to the center point C1 (see FIG. 4). The third curved edges 134, 144, 154 are defined as arcs of imaginary circles having their centers at points C4, C7 and C10 with the imaginary circles preferably having a radius of approximately 0.1136 millimeters. The third curved edges 134, 144, 154 are convex relative to the center point C1 (see FIG. 4).

The positioning of center points C8, C9 and C10 are provided relative to center point C1, namely at the intersection of the axes X-X, Y-Y and Z-Z. Each of center points C8, C9 and C10 are planar with center point C1 along the Z-Z axis. Center point C8 is provided along the Y-Y axis and approximately 0.1954 millimeters above the X-X axis (see FIG. 3). Center point C9 is provided along the Y-Y axis and approximately 0.2759 millimeters above the X-X axis (see FIG. 3). Center point C10 is provided approximately 0.2073 millimeters above the X-X axis and approximately 0.1747 millimeters to the right of the Y-Y axis (see FIG. 3). Center points C8 and C9 are provided within the third channel portion 126 while center point C10 is provided outside of the third channel portion 126.

Center points C2, C5 and C8 are all planar to one another and are separated from one another by 120 degrees, such that center points C2 and C5 are provided within the first and second channel portions 122, 124, respectively. Center points C3, C6 and C9 are all planar to one another and are separated from one another by 120 degrees, such that center points C3 and C6 are provided within the first and second channel portions 122, 124, respectively. Center points C4, C7 and C10 are all planar to one another and are separated from one another by 120 degrees, such that center points C4 and C7 are provided outside of the first and second channel portions 122, 124, respectively.

The bottom surface 118 thus defines an outer diameter thereof by an imaginary circle having its center along the Z-Z axis that is tangential to points P3, P7, P11, with the outer diameter being approximately 0.3546 millimeters. The points P3, P7, P11 define the endpoints of the first, second and third channel portions 122, 124, 126, respectively, of the bottom surface 118.

The recess wall 120 extends upwardly toward the upper surface 106 of the head 102 preferably at an outward taper, relative to the Z-Z axis, from the outer edges of the bottom surface 118, which include points P1-P12. The recess wall 120 thus defines straight wall portions 158, 160, 162, first curved wall portions 164, 166, 168, second curved wall portions 170, 172, 174, and third curved wall portions 176, 178, 180. The straight wall portions 158, 160, 162 taper upwardly toward the upper side 106 of the head 102 from points P1, P2, points P5, P6, and points P9, P10, respectively. The first curved wall portions 164, 166, 168 taper upwardly toward the upper surface 106 of the head 102 from points P2, P3, points P6, P7, and points P10, P11, respectively. The second curved wall portions 170, 172, 174 taper upwardly toward the upper surface 106 of the head 102 from points P3, P4, points P7, P8, and points P11, P12, respectively. The third curved wall portions 176, 178, 180 taper upwardly toward the upper surface 106 of the head 102 from points P4, P5, points P8, P9, and points P12, P1, respectively. The recess wall 120 may taper upwardly toward the upper surface 106 of the head 102 at any desired angle. If higher torque and no cam out is required, it is preferable that the angle of taper of the recess wall 120 be somewhat small relative to the Z-Z axis, for instance approximately ten degrees. However, where location and alignment of the recess 116 are more or equally as important than torque and cam out, a larger angle of taper of the recess wall 120 relative to the Z-Z axis may be utilized, for instance approximately twenty degrees.

A chamfer 182 preferably extends downwardly from the upper surface 106 of the head 102 to the recess wall 120. The chamfer 182 is preferably provided in order to assist with location and alignment of the recess 116. The chamfer 182 thus preferably is provided at a larger angle relative to the Z-Z axis than is the recess wall 120. The chamfer 182 is illustrated in FIG. 3, but is not illustrated in FIGS. 1 and 2. If the chamfer 182 is not provided, the recess wall 120 thus extends to the upper surface 106 of the head 102.

The size of the recess 116 at the upper surface 106 of the head 102 is thus entirely dependent on the taper angles of the recess wall 120 and the chamfer 182, if provided, as well as on the position of the center point C1 of the bottom surface 118 of the recess 116 relative to the upper surface 106 of the head 102.

Figure 14:
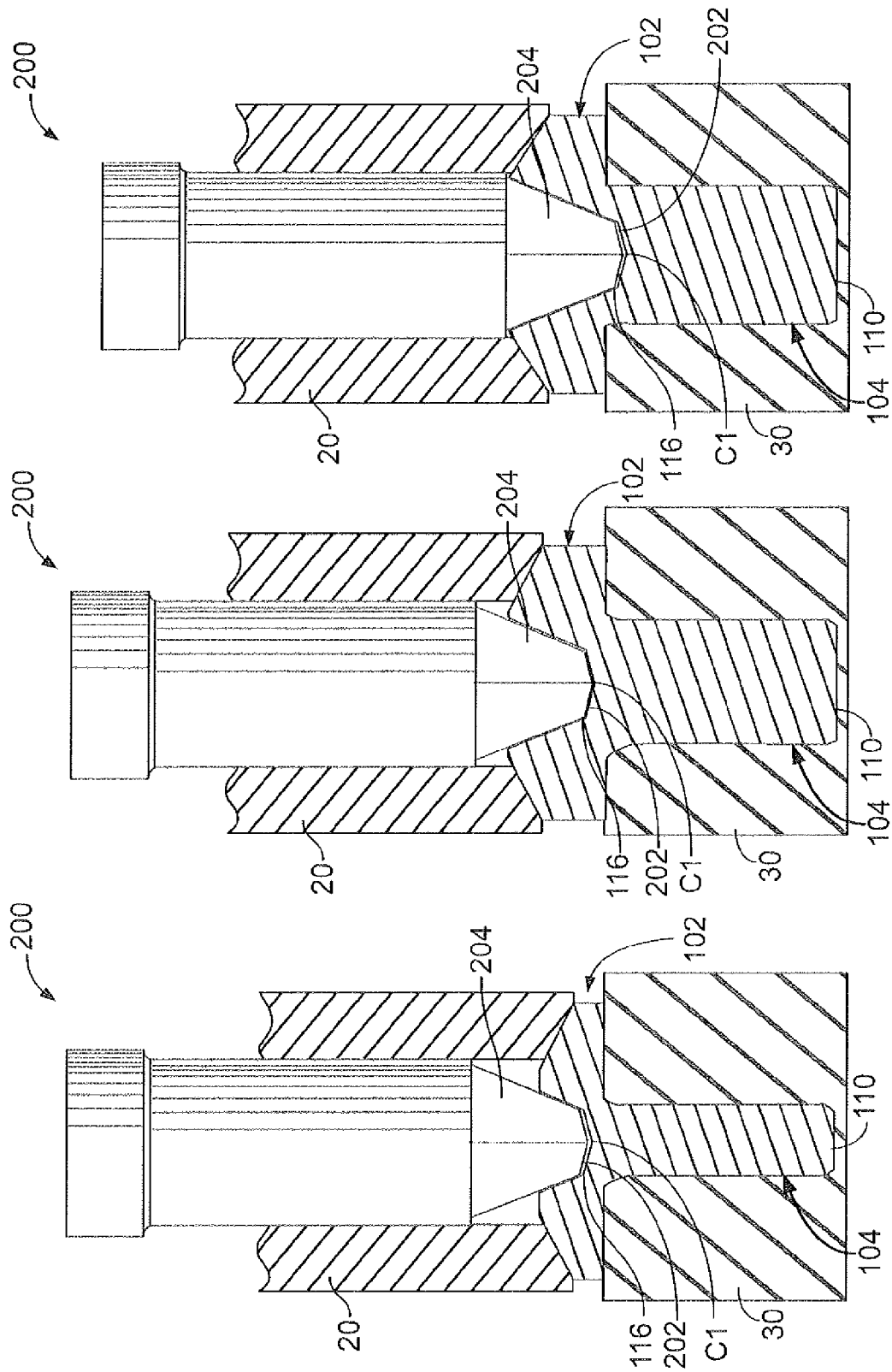
FIGS. 14A-14C are sectional views illustrating how the punch of FIG. 12 is used with other tooling to form the internally configured drive surfaces (the recess) of various sized fasteners, such as that illustrated in FIG. 1.

The recess 116 (and thus the internally configured drive surfaces) is formed by appropriate tooling, such as a punch 200, as illustrated in FIGS. 12-14C. The punch 200 has a working end surface 202 having an end point which is configured to form the bottom surface 118 (including its lowermost point C1) and a side surface 204 which is configured to form the recess wall 120. One of the manners in which the punch 200 could be utilized to form the recess 116 in the head 102 of the fastener 100 is illustrated in FIGS. 14A-14C. In this regard, prior to the formation of the thread on the shank 104, the fastener 100 is preferably placed in a two-piece fixture 20, 30. The punch 200 is received within the upper fixture element 20 and will engage and cold form the recess 116 into the head 102 of the fastener 100. During this operation, the head 102 of the fastener 100 may also be formed to its final configuration by the corresponding surfaces of the tool elements 20, 30, as illustrated having a flat lower surface 108 and a tapered upper surface 106.

Because the configuration of the bottom surface 118 and the recess wall 120 of the recess 116 of the fastener 100 can be utilized for various thicknesses of the head 102 or for various widths of the shank 104, as illustrated in FIGS. 14A-14C, only one configuration of the punch 200 needs to be provided, independent of the various sizes of fasteners 100 in which the recess 116 may be formed. Of course, if the chamfer 182 is to be provided, it may be necessary to have different punches 200 provided based on the thickness of the head 102 of the fastener 100 or based on the depth at which the bottom surface 118 of the recess 116 is to be provided in the fastener 100. Thus, the configuration of the recess 116 allows for better life of the punch 200 in forging.

The punched recess 116 extends through at least a portion of the thickness of the head 102 (see FIGS. 14A and 14B), and may extend through the entire thickness of the head 102 and into a portion of the second portion 114 of the shank 104 (see FIG. 14C). In certain embodiments, depending on the thickness of the head 102 and the thickness of the second portion 114 of the shank 104 (defined as a straight distance between the connection of the first and second portions 112, 114 of the shank 104 and the lower surface 108 of the head 102), the recess 116 may also extend into a portion of the first portion 112 of the shank 104 (not shown). As the center point C1 is provided at the deepest portion of the recess 116, the center point C1 may be provided in any one of the head 102 (see FIGS. 14A and 14B), the second portion 114 of the shank 104 (sec FIG. 14C), or the first portion 112 of the shank 104. Further, as the bottom surface 118 preferably tapers upwardly and outwardly from the center point C1 to the recess wall 120, the bottom surface 118 may extend in one or more of the head 102, the second portion 114 of the shank 104, and the first portion 112 of the shank 104.

Figure 8:
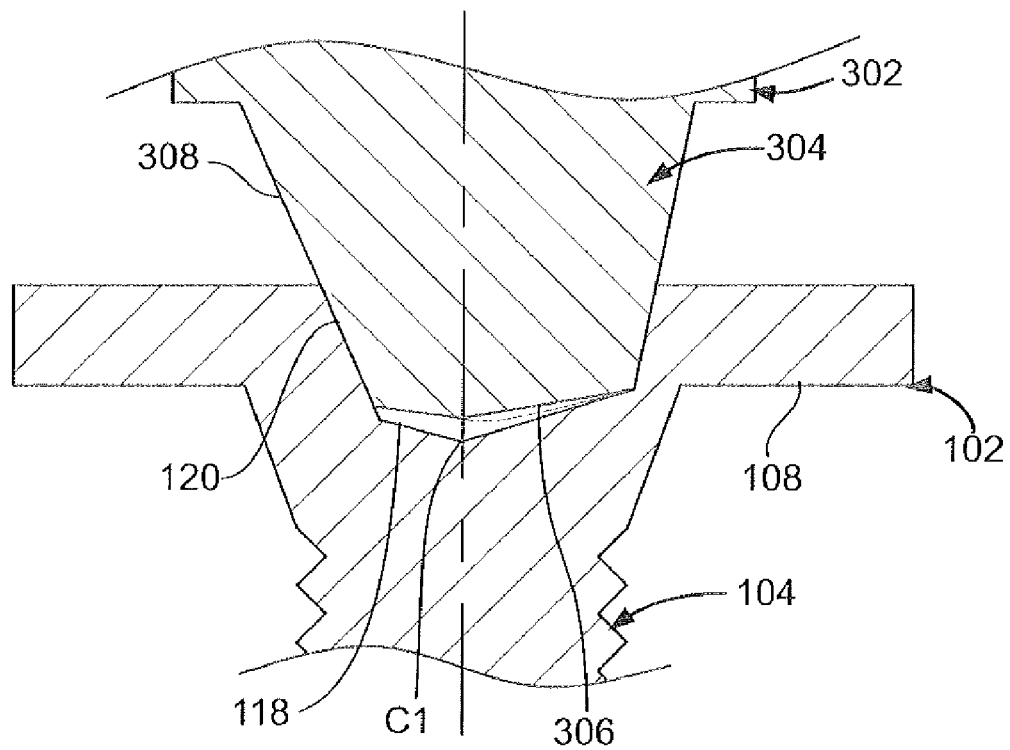
FIG. 8 is a cross-sectional view illustrating the externally configured drive surfaces of the drive tool illustrated in FIG. 5 positioned within the recess of the fastener illustrated in FIG. 1.
Figure 9:
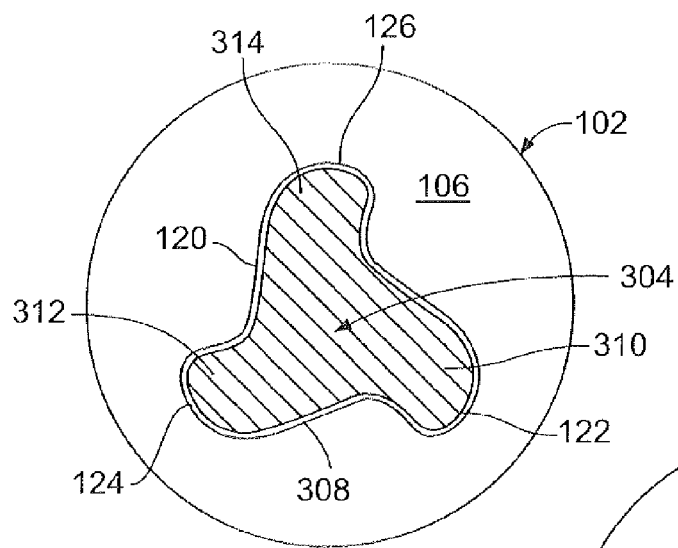
FIG. 9 is top view of the fastener illustrated in FIG. 1 and the externally configured drive surfaces of the drive tool illustrated in FIG. 5 positioned within the recess of the fastener, showing the drive tool in cross-section.

As illustrated in FIGS. 5-11, a drive tool 300 having a handle (not illustrated), a shank 302 and a driving contact or bit 304 may be provided. The driving contact or bit 304 is of a complementary, although not completely identical shape, to the recess 116 of the fastener 100 as the driving contact 304 has externally configured driving surfaces, namely a working end surface 306 with an end point (which generally corresponds to the bottom surface 118 of the recess 116 and its lowermost point C1—although the working end surface 306 need not be tapered at the same angle as the bottom surface 118 of the recess 116, as illustrated in FIG. 8) and a working side surface 308 (which generally corresponds to the recess wall 120 of the recess 116), such that three lobes 310, 312, 314 are defined by the driving contact 304. In order for the drive tool 300 to be easily received within the recess 116 and yet be effective when in driving engagement, the working side surface 308 must be dimensioned for a clearance fit with the recess 120. Also, in order to attain the desired driving engagement and depth of engagement, the shape of the driving contact 304 must be altered slightly so that the lobes 310, 312, 314 are respectively received within the lobes 122, 124, 126 of the recess 116 of the fastener 100 to a specific extent. Thus, while the lobes 310, 312, 314 of the drive tool 300 are complementary to the internally configured drive surfaces of the recess 116 of the fastener 100, it will be appreciated that for practical reasons they cannot be of an identical shape.

The drive tool 300 can be used to apply (install) and remove (uninstall) the fastener 100, by insertion of the complementary driving contact 304 into the recess 116 of the fastener 100 and then by rotation of the drive tool 300 such that the complementary driving contact 304 engages portions of the recess wall 120 of the fastener 100. Like the punch 200, a single drive tool 300 could be used to apply or remove fasteners 100 of different sizes having the recess 116 regardless of the position of the center point C1 of the bottom surface 118 of the recess 116 relative to the upper surface 106 of the head 102. The single drive tool 300 need only have the proper taper to complement the taper of the recess wall 120 and have a complementary driver contact 304 which is sufficient in length to handle various positions of the center point C1 relative to the upper surface 106 of the head 102.

Figure 10:
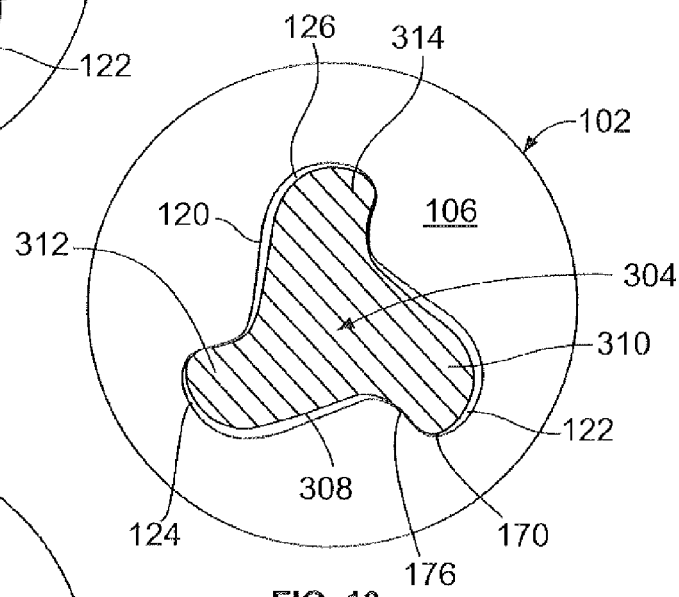
FIG. 10 is a top view of the fastener illustrated in FIG. 1 and the externally configured drive surfaces of the drive tool illustrated in FIG. 5 positioned within the recess of the fastener in an engaged position (via clockwise movement) with the internally configured drive surfaces of the fastener for installation, showing the drive tool in cross-section.
Figure 11:
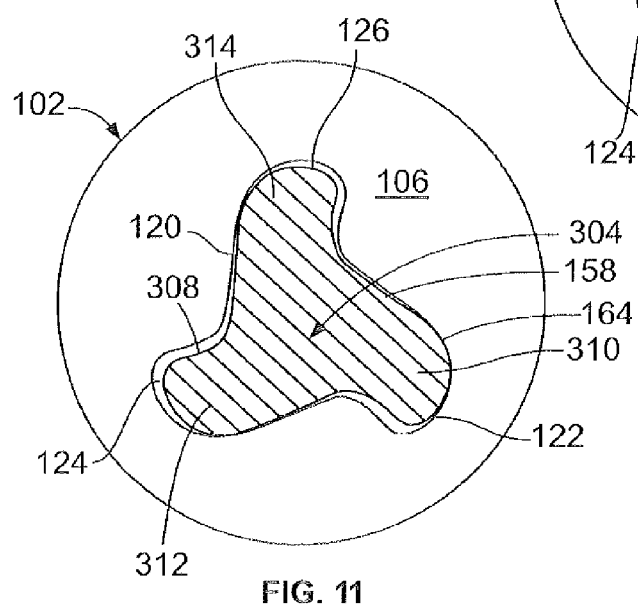
FIG. 11 is a top view of the fastener illustrated in FIG. 1 and the externally configured drive surfaces of the drive tool illustrated in FIG. 5 positioned within the recess of the fastener in an engaged position (via counter-clockwise movement) with the internally configured drives surfaces of the fastener for removal, showing the drive tool in cross-section.
Figure 12:
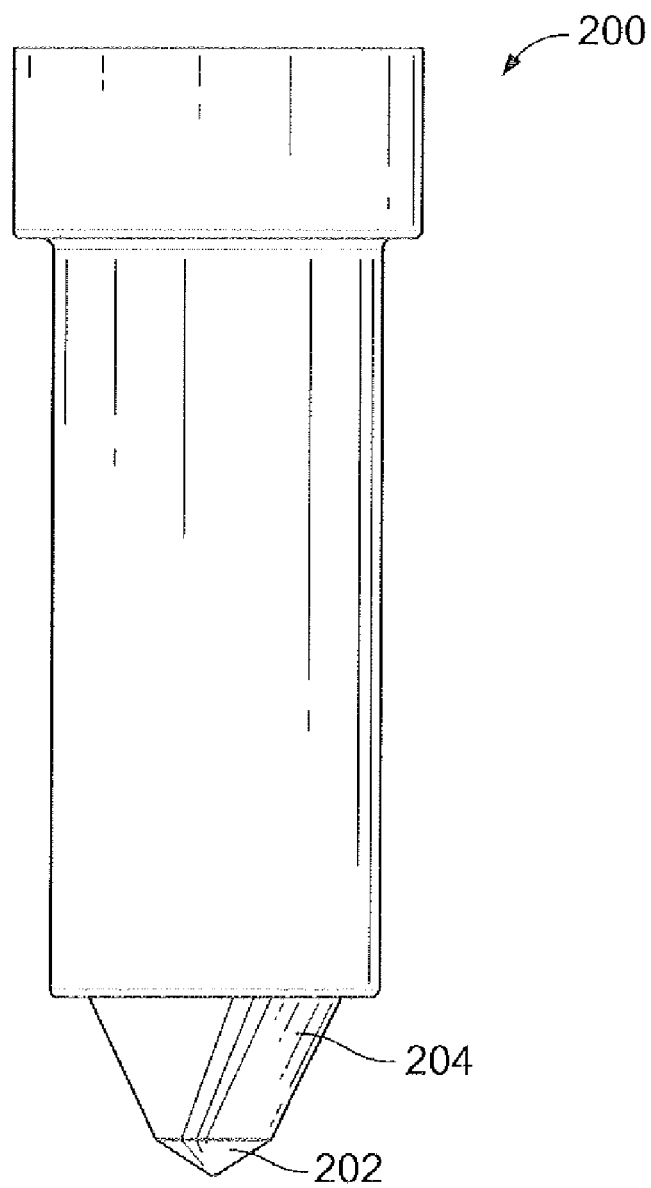
FIG. 12 is a plan view of a first described embodiment of tooling in the form of a punch for forming the internally configured drive surfaces in a component, such as the fastener illustrated in FIG. 1.
Figure 13:
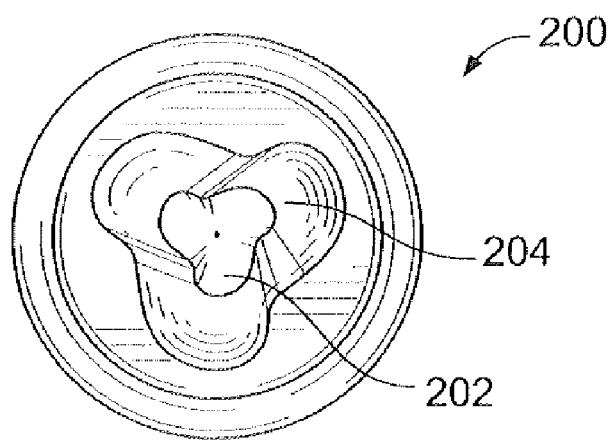
FIG. 13 is an end view of the punch of FIG. 12.

In operation, a user inserts the complementary driving contact 304 into the recess 116 of the fastener 100 such that lobe 310 is positioned within the first channel portion 122, such that lobe 312 is positioned within the second channel portion 124, and such that lobe 314 is positioned within the third channel portion 126. In each situation, a degree of clearance is provided (see FIG. 9). If provided, the chamfer 182 assists with the location and alignment of the complementary driving contact 304 with the recess 116. In order to apply or tighten the fastener 100 in place, a user rotates the drive tool 300 in a clockwise manner such that the complementary driving contact 304 of the drive tool 300 comes into contact with the recess wall 120, preferably, at a minimum, with the second curved wall portions 170, 172, 174 and portions of the third curved wall portions 176, 178, 180, as illustrated in FIG. 10. In order to remove or loosen the fastener 100, a user rotates the drive tool 300 in a counter-clockwise manner such that the complementary driving contact 304 of the drive 300 comes into contact with the recess wall 120, preferably, al a minimum, with the first curved wall portions 164, 166, 168 and portions of the straight wall portions 158, 160, 162, as illustrated in FIG. 11.

Directing attention to FIGS. 15-18, there is illustrated a second preferred embodiment of a fastener and drive tool arrangement, which is a miniature fastener and drive tool arrangement. The fastener is designated generally as 400, and is identical in configuration to the fastener 100 of the first preferred embodiment, except as described herein, where like elements of the fastener 400 to like elements of the fastener 100 are described with like reference numerals.

Figure 15:
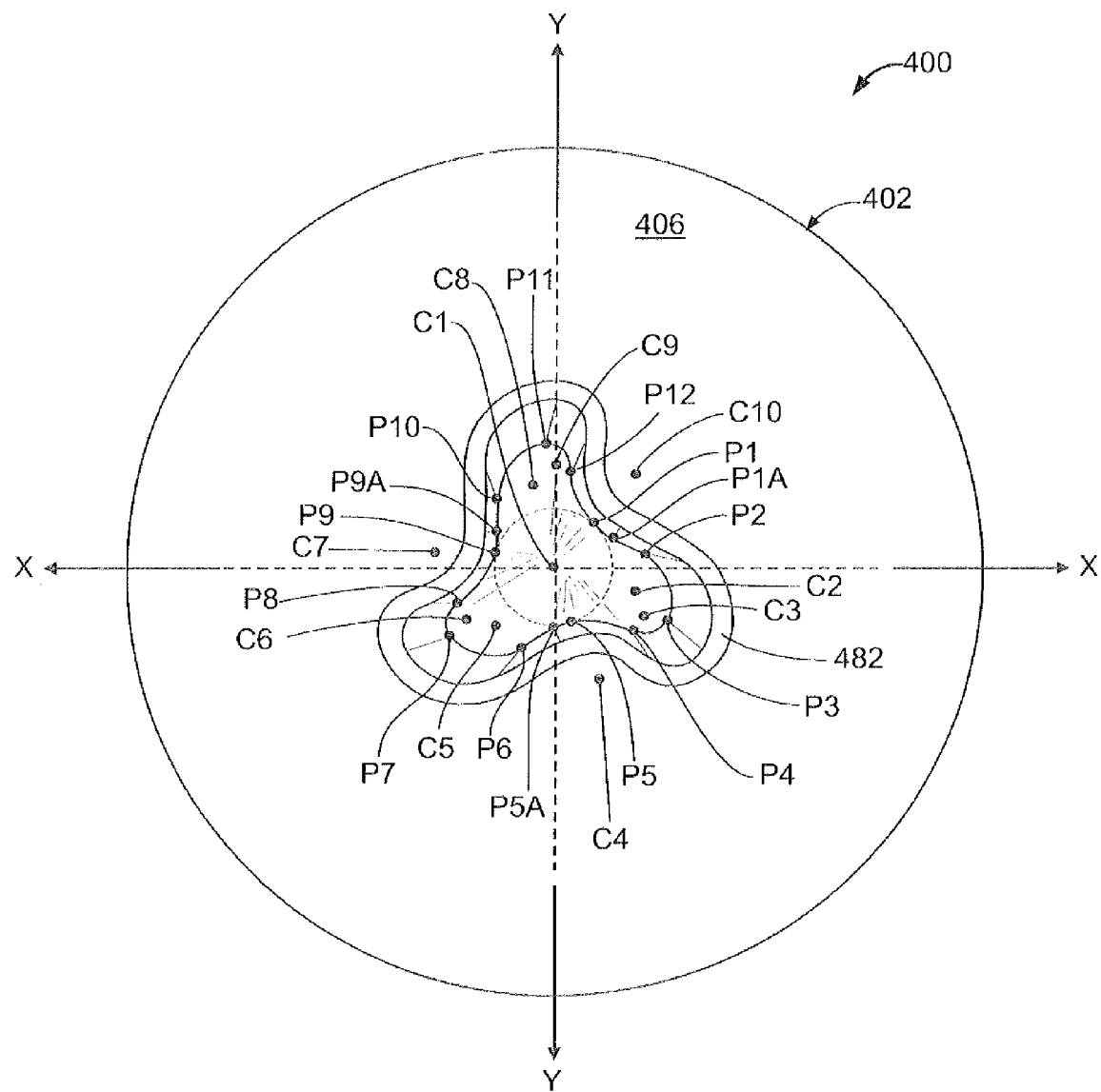
FIGS. 15 and 16 are identical top views of a second described embodiment of a fastener having internally configured drive surfaces defining a recess of the fastener.
Figure 16:
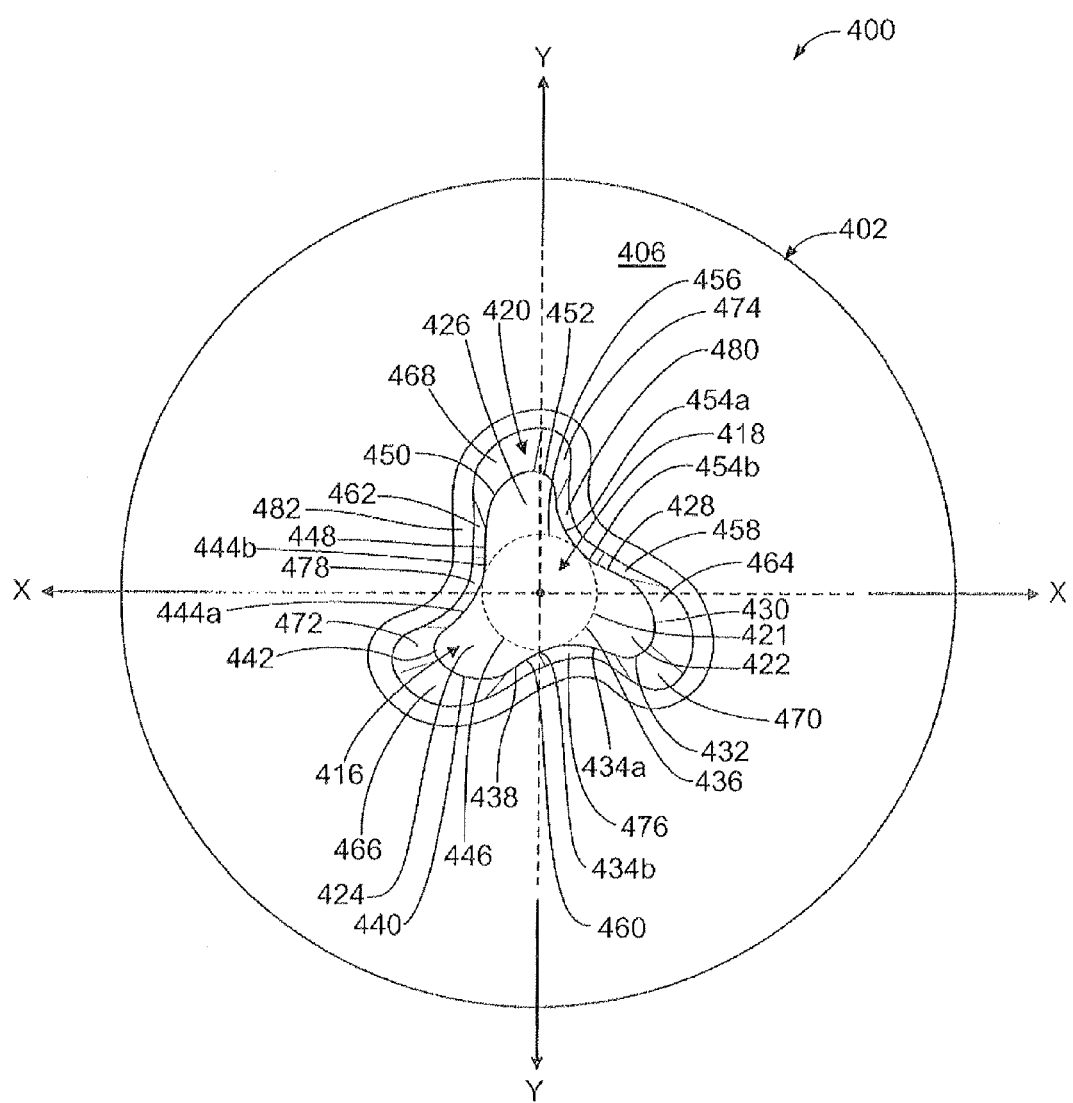

A recess or socket 416 is formed in the fastener 400 through the upper surface 406 of the head 402. The recess 416 defines internally configured drive surfaces, namely a bottom surface (alternatively referred to as a base surface or an end surface) 418 and a recess wall (alternatively referred to as a side surface) 420 that extends upwardly from the bottom surface 418 to the upper surface 406 of the head 402. The bottom surface 418 has a center point C1 which is preferably provided along the longitudinal axis Z-Z (not shown, yet clearly understood with reference to FIG. 2). The center point C1 is also provided along an axis X-X and along an axis Y-Y, as illustrated in FIG. 15. The center point C1 is provided at the deepest portion of the recess 416 with respect to the upper surface 406 of the head 402. The bottom surface 418 preferably tapers upwardly and outwardly from the center point C1 to the recess wall 420. The bottom surface 418 has a center portion 421 and preferably has first, second and third channel portions or lobes 422, 424, 426, each of which are preferably identical in configuration to one another. The center portion 421 is preferably circular in configuration with the center point C1 being the center thereof, and is illustrated in dashed line (see FIGS. 15 and 16) as the boundaries of the center portion 421 are imaginary.

The first channel portion or lobe 422 is defined by a first curved edge 454*b*, a straight edge 428, a second curved edge 430, a third curved edge 432, a fourth curved edge 434*a*, and an imaginary arc 436 defined by the circular center portion 421. The first curved edge 454*b* extends from a point P1 to a point P1A. The straight edge 428 extends from the point P1A to a point P2. The second curved edge 430 extends from the point P2 to a point P3. The third curved edge 432 extends from the point P3 to a point P4. The fourth curved edge 434*a* extends from the point P4 to a point P5. The arc 436 defined by the circular center portion 421 extends from point P5 to point P1 such that the circular center portion 421 is tangential to points P1 and P5.

The second channel portion or lobe 424 is preferably formed in an identical manner as the first channel portion or lobe 422 such that the second channel portion or lobe 424 is defined by a first curved edge 434*b*, a straight edge 438, a second curved edge 440, a third curved edge 442, a fourth curved edge 444*a*, and an imaginary arc 446 defined by the circular center portion 421. The first curved edge 434*b* extends from the point P5 to a point P5A. The straight edge 438 extends from the point P5A to a point P6. The second curved edge 440 extends from the point P6 to a point P7. The third curved edge 442 extends from the point P7 to a point P8. The fourth curved edge 444*a* extends from the point P8 to a point P9. The arc 446 defined by the circular center portion 421 extends from point P9 to point P5 such that the circular center portion 421 is tangential to points P5 and P9.

The third channel portion or lobe 426 is also preferably formed in an identical manner as the first channel portion or lobe 422 such that the third channel portion or lobe 426 is defined by a first curved edge 444*b*, a straight edge 448, a second curved edge 450, a third curved edge 452, a fourth curved edge 454*a*, and an imaginary arc 456 defined by the circular center portion 421. The first curved edge 444*b* extends from the point P9 to a point P9A. The straight edge 448 extends from the point P9A to a point P10. The second curved edge 450 extends from the point P10 to a point P11. The third curved edge 452 extends from the point P11 to a point P12. The fourth curved edge 454*a* extends from the point P12 to the point P1. The arc 456 defined by the circular center portion 421 extends from point P1 to point P9 such that the circular center portion 421 is tangential to points P1 and P9.

The positioning of points P1, P1A, P2, P3, P4 and P5 are provided relative to the center point C1, namely at the intersection of the axes X-X, Y-Y and Z-Z, Each of points P1, P1A and P2 are provided above the X-X axis (see FIG. 15), to the right of the Y-Y axis (see FIG. 15), and above the center point C1. Of points P1, P1A and P2, point P2 is closest to the X-X axis and point P1 is furthest from the X-X axis. Of points P1, P1A and P2, point P1 is closest to the Y-Y axis and point P2 is furthest from the Y-Y axis. Each of points P3 and P4 are provided below the X-X axis (see FIG. 15), to the right of the Y-Y axis (see FIG. 15), and above the center point C1. Of points P3 and P4, point P3 is closest to the X-X axis and point P4 is closest to the Y-Y axis. Point P5 is provided below the X-X axis (farther away than point P4) (see FIG. 15), just to the left of the Y-Y axis (see FIG. 15), and above the center point P1.

Points P1, P5 and P9 are all planar to one another and are preferably separated from one another by 120 degrees. Arc 436 connecting points P1, P5, arc 446 connecting points P5, P9, and arc 456 connecting points P9, P1 form the circular center portion 421. Points P1A, P5A and P9A are all planar to one another and are separated from one another by 120 degrees. Points P2, P6 and P10 arc all planar to one another and are separated from one another by 120 degrees. Points P3, P7 and P11 arc all planar to one another and are separated from one another by 120 degrees. Points P4, P8 and P12 are all planar to one another and are separated from one another by 120 degrees.

The first curved edges 454*b*, 434*b*, 444*b* are defined as arcs of imaginary circles having their centers at points C10, C4 and C7. The first curved edges 454*b*, 434*b*, 444*b* are convex relative to the center point C1 (see FIG. 16). The second curved edges 430, 440, 450 are defined as arcs of imaginary circles having their centers at points C2, C5 and C8. The second curved edges 430, 440, 450 are concave relative to the center point (see FIG. 16). The third curved edges 432, 442, 452 are defined as arcs of imaginary circles having their centers at points C3, C6 and C9. The third curved edges 432, 442, 452 are concave relative to the center point (see FIG. 16). The fourth curved edges 434*a*, 444*a*, 454*a* are defined as arcs of imaginary circles having their centers at points C4, C7 and C10. The fourth curved edges 434*a*, 444*a*, 454*a* are convex relative to the center point C1 (see FIG. 16). The fourth curved edge 434*a* and the first curved edge 434*b* are extensions of one another formed at the same radius about point C4; the fourth curved edge 444*a* and the first curved edge 444*b* are extensions of one another formed at the same radius about point C7; and the fourth curved edge 454a and the first curved edge 454b are extensions of one another formed at the same radius about point C10.

The positioning of center points C8, C9 and C10 are provided relative to center point C1, namely at the intersection of the axes X-X, Y-Y and Z-Z. Each of center points C8, C9 and C10 are planar with center point C1 along the Z-Z axis. Center point C8 is provided above the X-X axis (see FIG. 15) and to the left of the Y-Y axis (see FIG. 15). Center point C9 is provided above the X-X axis (sec FIG. 15) and along (or at least in close proximity to) the Y-Y axis (sec FIG. 15), Center point C10 is provided above the X-X axis (see FIG. 15) and to the right of the Y-Y axis (see FIG. 15). Of center points C8, C9 and CIO, center point C8 is closest to the X-X axis and center point C9 is furthest from the X-X axis. Center points C8 and C9 are provided within the third channel portion 426 while center point C10 is provided outside of the third channel portion 426.

Center points C2, C5 and C8 are all planar to one another and are separated from one another by 120 degrees, such that center points C2 and C5 are provided within the first and second channel portions 422, 424, respectively. Center points C3, C6 and C9 are all planar to one another and are separated from one another by 120 degrees, such that center points C3 and C6 are provided within the first and second channel portions 422, 424, respectively. Center points C4, C7 and C10 are all planar to one another and are separated from one another by 120 degrees, such that center points C4 and C7 are provided outside of the first and second channel portions 422, 424, respectively.

The bottom surface 418 thus defines an outer diameter thereof by an imaginary circle having its center along the Z-Z axis that is tangential to points P3, F7 and P11. The points P3, P7 and P11 define the endpoints of the first, second and third channel portions 422, 424, 426, respectively, of the bottom surface 418.

The recess wall 420 extends upwardly toward the upper surface 406 of the head 402 preferably at an outward taper, relative to the Z-Z axis, from the outer edges of the bottom surface 418, which include point P1-P12. The recess wall 420 thus defines first curved wall portions 480b, 476b, 478b, straight wall portions, 458, 460, 462, second curved wall portions 464, 466, 468, third curved wall portions 470, 472, 474, and fourth curved wall portions 476a, 478a, 480a. The first curved wall portions 480b, 476b, 478b taper upwardly toward the upper side 406 of the head 402 from points P1, P1A, points P5, P5A, and points P9, P9A, respectively. The straight wall portions 458, 460, 462 taper upwardly toward the upper side 406 of the head 402 from points P1A, P2, points P5A, P6, points P9A, P10, respectively. The second curved wall portions 464, 466, 468 taper upwardly toward the upper surface 406 of the head 402 from points P2, P3, points P6, P7, and points P10, P11, respectively. The third curved wall portions 470, 472, 474 taper upwardly toward the upper surface 406 of the head 402 from points P3, P4, points P7, P8, and points P11, P12, respectively. The fourth curved wall portions 476a, 478a, 480a taper upwardly toward the upper surface 406 of the head 402 from points P4, P5, points P8, P9, and points P12, P1, respectively. The recess wall 420 may taper upwardly toward the upper surface 406 of the head 402 at any desired angle. If higher torque and no cam out is required, it is preferable that the angle of taper of the recess wall 420 be somewhat small relative to the Z-Z axis, for instance approximately ten degrees. However, where location and alignment of the recess 416 are more or equally as important than torque or cam out, a larger angle of taper of the recess wall 420 relative to the Z-Z axis may be utilized, for instance approximately twenty degrees.

A chamfer 482 preferably extends downwardly from the upper surface 406 of the head 402 to the recess wall 420. The chamfer 482 is preferably provided in order to assist with location and alignment of the recess 416. The chamfer 482 thus preferably is provided at a larger angle relative to the Z-Z axis than is the recess wall 420. If the chamfer 482 is not provided, the recess wall 420 thus extends to the upper surface 406 of the head 402.

The size of the recess 416 at the upper surface 406 of the head 402 is thus entirely dependent on the taper angles of the recess wall 420 and the chamfer 482, if provided, as well as on the position of the center point C1 of the bottom surface 418 of the recess 416 relative to the upper surface 406 of the head 402.

Figure 19:
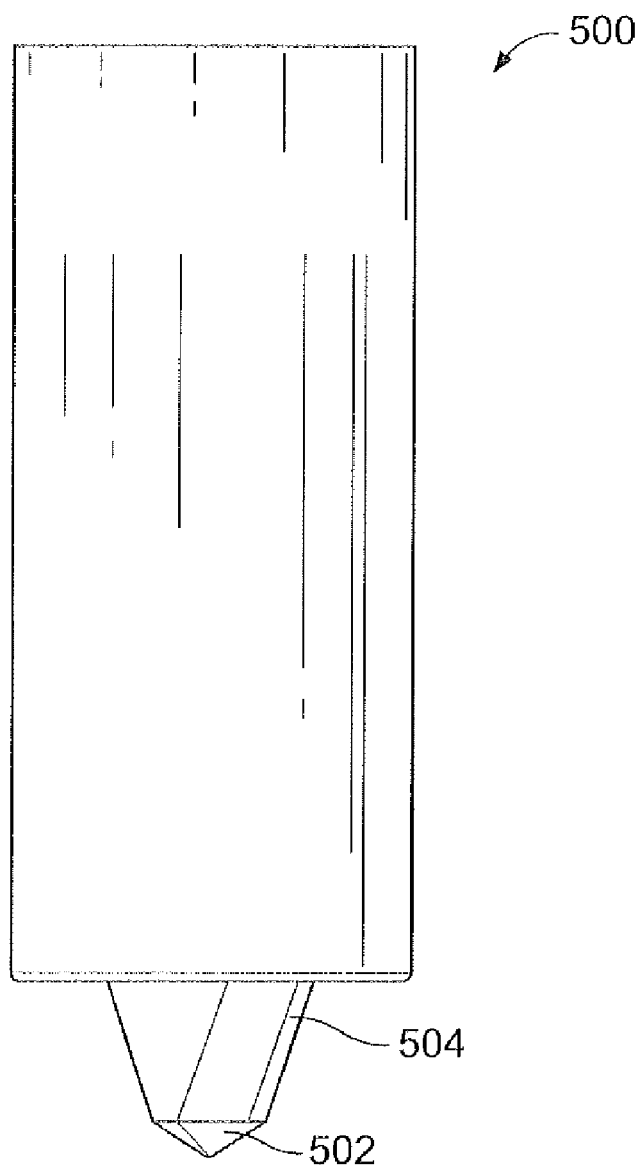
FIG. 19 is a plan view of a second described embodiment of tooling in the form of a punch for forming the internally configured drive surfaces in a component, such as the fastener illustrated in FIGS. 15 and 16.
Figure 20:
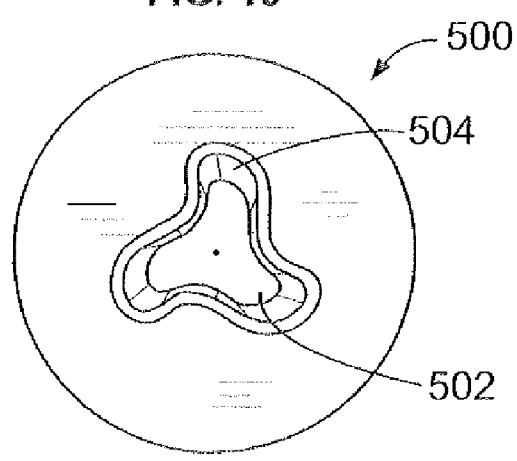
FIG. 20 is an end view of the punch of FIG. 19.

The recess 416 (and thus the internally configured drive surfaces) is formed by appropriate tooling, such as a punch 500, as illustrated in FIGS. 19 and 20. The punch 500 has a working end surface 502 having an end point which is configured to form the bottom surface 418 (including its lowermost point C1) and a side surface 504 which is configured to form the recess wall 420.

Because the configuration of the bottom surface 418 and the recess wall 420 of the recess 416 of the fastener 400 can be utilized for various thicknesses of the head 402 or for various widths of the shank (not shown), only one configuration of the punch 500 needs to be provided, independent of the various sizes of fasteners 400 in which the recess 416 may be formed. Of course, if the chamfer 482 is to be provided, it may be necessary to have different punches 500 provided based on the thickness of the head 402 of the fastener 400 or based on the depth at which the bottom surface 418 of the recess 416 is to be provided in the fastener 400. Thus, the configuration of the recess 416 allows for better life of the punch 500 in forging.

Figure 17:
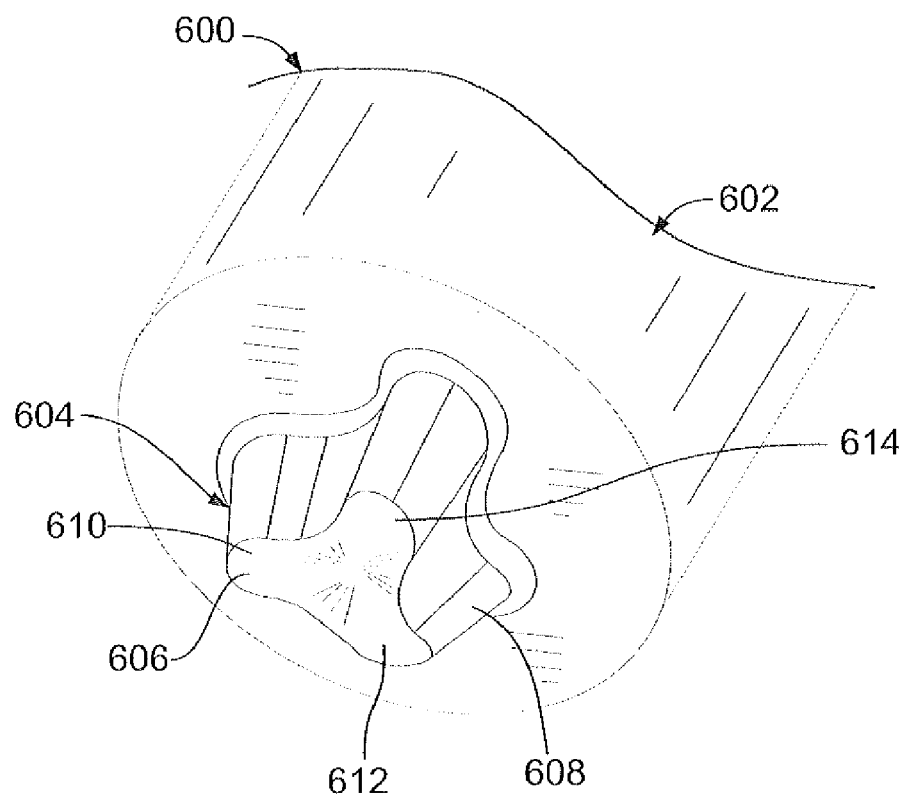
FIG. 17 is a perspective view of a second described embodiment of a drive tool having externally configured drive surfaces.
Figure 18:
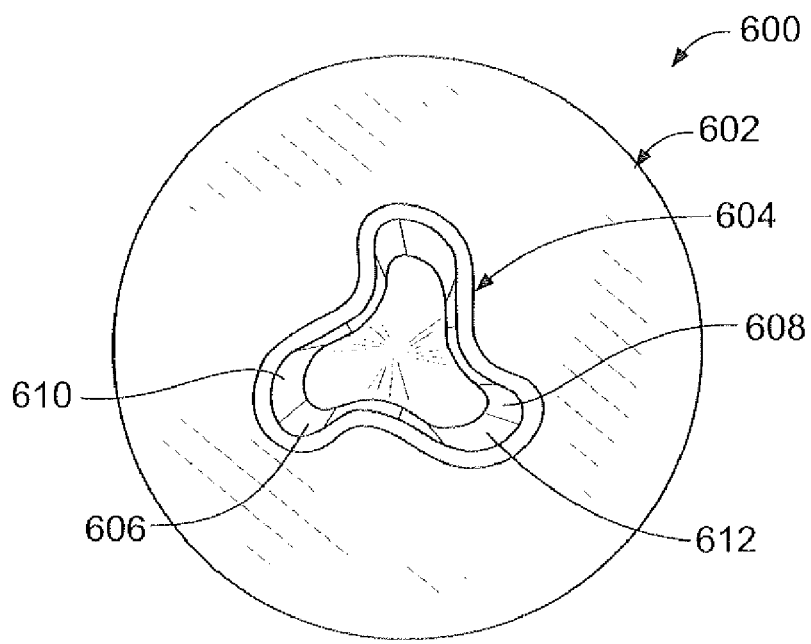
FIG. 18 is an end view of the drive tool illustrated in FIG. 17.

As illustrated in FIGS. 17 and 18, a drive tool 600 having a handle (not illustrated), a shank 602 and a driving contact or bit 604 may be provided. The driving contact or bit 604 is of a complementary, although not identical shape, to the recess 416 of the fastener 400 as the driving contact 604 has externally configured driving surfaces, namely a working end surface 606 with an end point (which generally corresponds to the bottom surface 418 of the recess 416 and its lowermost point C1 although the working end surface 606 need not be tapered at the same angle as the bottom surface 418 of the recess 416) and a working side surface 608 (which generally corresponds to the recess wall 420 of the recess 416), such that three lobes 610, 612, 614 are defined by the driving contact 604. In order for the drive tool 600 to be easily received within the recess 416 and yet be effective when in driving engagement, the working side surface 408 must be dimensioned for a clearance fit with the recess 420. Also, in order to attain the desired driving engagement and depth of engagement, the shape of the driving contact 604 must be altered slightly so that the lobes 610, 612, 614 are respectively received within the lobes 422, 424, 426 of the recess 416 of the fastener 400 to a specific extent. Thus, while the lobes 610, 612, 614 of the drive tool 600 are complementary to the internally configured drive surfaces of the recess 416 of the fastener 400, it will be appreciated that for practical reasons they cannot be of an identical shape.

The drive tool 600 can be used to apply (install) and remove (uninstall) the fastener 400, by insertion of the complementary driving contact 604 into the recess 416 of the fastener 400 and then by rotation of the drive tool 600 such that the complementary driving contact 604 engages portions of the recess wall 420 of the fastener 400. Like the punch 500, a single drive tool 600 could be used to apply or remove fasteners 400 of different sizes having the recess 416 regardless of the position of the center point C1 of the bottom surface 418 of the recess 416 relative to the upper surface 406 of the head 402. The single drive tool 600 need only have the proper taper to complement the taper of the recess wall 420 and have a complementary driver contact 604 which is sufficient in length to handle various positions of the center point C1 relative to the upper surface of the head 402.

In operation, a user inserts the complementary driving contact 604 into the recess 416 of the fastener 400 such that lobe 610 is positioned within the first channel portion 422, such that lobe 612 is positioned within the second channel portion 424, and such that lobe 614 is positioned within the third channel portion 426. In each situation, a degree of clearance is provided. If provided, the chamfer 482 assists with the location and alignment of the complementary driving contact 604 with the recess 416. In order to apply or tighten the fastener 400 in place, a user rotates the drive tool 600 in a clockwise manner such that the complementary driving contact 604 of the drive tool 600 comes into contact with the recess wall 420, preferably, at a minimum, with the third curved wall portions 470, 472, 474 and portions of the fourth curved wall portions 476a, 478a, 480a. In order to remove or loosen the fastener 400, a user rotates the drive tool 600 in a counter-clockwise manner such that the complementary driving contact 604 of the drive tool 600 comes into contact with the recess wall 420, preferably, at a minimum, with the second curved wall portions 464, 466, 468 and portions of the straight wall portions 458, 460, 462.

It has been found that the described unique profile of the recesses 116, 416 allow for the thickness of the heads 102, 402 to be thinner than those of prior art miniature fasteners, yet the fasteners 100, 400 are able to deliver a higher tightening torque than the prior art miniature fasteners.

The unique profile of the recesses 116, 416 also may allow for the fasteners 100, 400 to be tamper-proof, as the bits 304, 604 necessary for tightening or untightening the fasteners 100, 400 are not available on the open market.

The preferred embodiments of the drive systems described herein allow for easy alignment, an increased effective contact area, and greatly reduces slippage during installation/removal. They also increase the life of the fasteners 100, 400 and the bits 304, 604 used to install/remove the fasteners 100, 400. The drive systems also allow for the use of common dies, punches and bits in the formation and operation thereof. Furthermore, the drive systems have no cam-out or drive feature damage and allow for higher installation torque transmission.

It is to be understood that while the fasteners 100, 400, the punches 200, 500 and the drive tools 300, 600 are all described as having three lobes separated by approximately 120 degrees, that those of ordinary skill in the art will appreciate that the drive systems described herein could be formed with only two lobes (separated by approximately 180 degrees), or with four lobes (separated by approximately 90 degrees), or more than four lobes, as desired.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments of the invention and does not pose a limitation on the scope of the invention unless otherwise claimed. No language in the specification should be construed as indicating any non-claimed element as essential to the practice of the invention. It is further to be understood that the drawings are not necessarily drawn to scale.

Preferred embodiments of this invention are described herein, including the best mode known to the inventor for carrying out the invention, it should be understood that the illustrated embodiments are exemplary only, and should not be taken as limiting the scope of the invention.

The invention is claimed as follows:

1. An article of manufacture for use in a torque transmitting system having a longitudinal axis, said article of manufacture comprising:
a drive surface configuration having a side surface and an end surface, said end surface tapers upwardly and outwardly from a lowermost point provided along the longitudinal axis to said side surface, said end surface defining a plurality of identically configured lobes, each said lobe extending from a first point to a second point, said first point of one of said plurality of lobes being said second point of an adjacent one of said plurality of lobes, each of said first and second points of each said lobe being provided along an imaginary circle having its center along the longitudinal axis, said side surface extends upwardly from said end surface defining said plurality of lobes, each of said lobes extends from said first point to said second point by, in series, a first convex edge, a straight edge, first and second concave edges, and a second convex edge, said first and second convex edges each being tangential to said imaginary circle.

2. The article of manufacture as defined in claim 1, wherein said first convex edge of each said lobe is defined by a first radius about a first axis which is parallel to, but offset from, the longitudinal axis, and which does not extend through said respective lobe or said imaginary circle, and wherein said first concave edge of each said lobe is defined by a second radius about a second axis which is parallel to, but offset from, the longitudinal axis, and which extends through said respective lobe, and wherein said second concave edge of each said lobe is defined by a third radius about a third axis which is parallel to, but offset from, the longitudinal axis, and which extends through said respective lobe, and wherein said second convex edge of each said lobe is defined by said first radius about a fourth axis which is parallel to, but offset from, the longitudinal axis, and which does not extend through said respective lobe or said imaginary circle.

3. The article of manufacture as defined in claim 1, wherein said plurality of lobes comprises a first lobe, a second lobe and a third lobe, wherein said first points of each said lobe are separated from one another by 120 degrees.

4. The article of manufacture as defined in claim 1, wherein said article of manufacture comprises a fastener having a head and a shank, said head having upper and lower surfaces, said shank extending downwardly from said lower surface of said head about the longitudinal axis, and wherein said drive surface configuration is an internally configured drive surface defined by a recess formed through said upper surface of said head of said fastener, said recess defining a recess wall and a bottom surface, wherein said side surface is said recess wall, and wherein said end surface is said bottom surface.

5. The article of manufacture as defined in claim 4, wherein said recess wall tapers upwardly and outwardly relative to the longitudinal axis from said edges defining said plurality of lobes toward said upper surface of said head.

6. The article of manufacture as defined in claim 5, wherein said recess wall tapers upwardly and outwardly to said upper surface of said head.

7. The article of manufacture as defined in claim 5, wherein said recess further defines a chamfer, said chamfer tapering upwardly and outwardly from said recess wall to said upper surface of said head.

8. The article of manufacture as defined in claim 4, wherein said lowermost point is located within said head of said fastener.

9. The article of manufacture as defined in claim 4, wherein said lowermost point is located within said shank of said fastener.

10. The article of manufacture as defined in claim 4, wherein a drive tool having a driving contact with complementary externally configured driving surfaces is configured to be inserted into said recess in order to install and/or remove said fastener, whereby said fastener can be installed by rotating said drive tool in a clockwise direction, and whereby said fastener can be removed by rotating said drive tool in a counter-clockwise direction.

11. A fastener comprising:
a shank extending about a central axis; and
an internally configured drive surface which is accessible from an upper surface of said fastener, said internally configured drive surface comprising:
a base surface having a plurality of outer edges defining a plurality of lobes, each said lobe having a first edge which extends from a first point to a second point in a convex manner, a second edge which extends from said second point to a third point in a straight manner, a third edge which curves from said third point to a fourth point in a concave manner, a fourth edge which curves from said fourth point to a fifth point in a concave manner, and a fifth edge which curves from said fifth point to a sixth point in a convex manner, wherein said sixth point of one of said plurality of lobes is said first point of an adjacent one of said plurality of lobes, and wherein said first and sixth points of each said lobe are provided along an imaginary circle having its center along the central axis; and
a wall which extends upwardly from said plurality of outer edges toward said upper surface of said fastener.

12. The fastener as defined in claim 11, wherein said base surface has a center point which is provided along the central axis.

13. The fastener as defined in claim 12, wherein said center point is a lowermost point of said recess such that said base surface tapers upwardly and outwardly relative to the central axis from said center point to said plurality of edges.

14. The fastener as defined in claim 13, wherein said center point is provided in a head of said fastener.

15. The fastener as defined in claim 13, wherein said center point is provided in said shank.

16. The fastener as defined in claim 11, wherein said wall is tapered relative to the central axis from said outer edges toward the upper surface of the fastener.

17. The fastener as defined in claim 11, wherein a chamfer is provided between said wall and an upper surface of a head of the fastener.

18. The fastener as defined in claim 11, wherein said internally configured drive surface is formed by a forming tool having a complementary externally configured drive surface.

19. The fastener as defined in claim 11, wherein a drive tool having a driving contact with a complementary externally configured driving surface can engage said internally configured driving surface by clockwise rotation in order to install said fastener and can engage said internally configured driving surface by counter-clockwise rotation in order to uninstall said fastener.

20. The fastener as defined in claim 11 further comprising:
a head having upper and lower head surfaces, where the shank extends downwardly from said lower head surface about a central axis of the fastener.

21. The fastener as defined in claim 11, wherein said wall is tapered relative to the central axis from said outer edges toward the upper head surface.

22. The article of manufacture for use in a torque transmitting system having a longitudinal axis, said article of manufacture comprising:
a drive surface configuration having a side surface and an end surface, said end surface extending from a center point along the longitudinal axis to an outer edge thereof which defines a plurality of identically configured lobes, each said lobe extending from a first point to a second point, said first point of one of said plurality of lobes being said second point of an adjacent one of said plurality of lobes, each of said first and second points of each said lobe being provided along an imaginary circle having its center along the longitudinal axis, said side surface extends upwardly and outwardly from said outer edge of said end surface, each of said lobes extends from said first point to said second point by, in series, a first convex edge, a straight edge, first and second concave edges, and a second convex edge, said first and second convex edges each being tangential to said imaginary circle.

23. The article of manufacture as defined in claim 22, wherein said plurality of lobes comprises a first lobe, a second lobe and a third lobe, wherein said first points of each said lobe are separated from one another by 120 degrees.

24. The article of manufacture as defined in claim 22, wherein said article of manufacture comprises a fastener having a head and a shank, said head heaving upper and lower surfaces, said shank extending downwardly from said lower surface of said head about the longitudinal axis, and wherein said drive surface configuration is an internally configured drive surface defined by a recess formed through said upper surface of said head of said fastener, said recess defining a recess wall and a bottom surface, wherein said side surface is said recess wall, and wherein said end surface is said bottom surface.

25. The article of manufacture as defined in claim 24, wherein said bottom surface tapers relative to the longitudinal axis upwardly and outwardly from said center point to said outer edge.

26. The article of manufacture as defined in claim 25, wherein said center point is located within said head of said fastener.

27. The article of manufacture as defined in claim 25, wherein said center point is located within said shank of said fastener.

28. The article of manufacture as defined in claim 24, wherein said recess wall tapers relative to the longitudinal axis upwardly and outwardly to said upper surface of said head.

29. The article of manufacture as defined in claim 24, wherein said recess further defines a chamfer, said chamfer tapering upwardly and outwardly from said recess wall to said upper surface of said head.

30. The article of manufacture as defined in claim 24, wherein a driver tool having a driving contact with complementary externally configured driving surfaces is configured to be inserted into said recess in order to install and/or remove said fastener, whereby said fastener can be installed by rotating said driver tool in a clockwise direction, and whereby said fastener can be removed by rotating said driver tool in a counter-clockwise direction.

* * * * *

UNITED STATES PATENT AND TRADEMARK OFFICE
CERTIFICATE OF CORRECTION

PATENT NO. : 8,182,187 B2  
APPLICATION NO. : 12/427522  
DATED : May 22, 2012  
INVENTOR(S) : Phua Cheng Siong Page 1 of 1

It is certified that error appears in the above-identified patent and that said Letters Patent is hereby corrected as shown below:

Column 1, line 66, "arc" should read --are--.  
Column 5, line 13, "horn" should read --from--.  
Column 5, line 36, "Pit)" should read --P10--.  
Column 9, line 9, "al" should read --at--.  
Column 10, line 23, "Z-Z," should read --Z-Z.--.  
Column 10, line 43, "arc" should read --are--.  
Column 10, line 45, "arc" should read --are--.  
Column 11, line 11, "FIG. 15), Center" should read --FIG. 15). Center--.  
Column 11, line 14, "CIO" should read --C10--.  
Column 11, line 34, "F7" should read --P7--.  
Column 12, line 45, "C1 although" should read --C1 – although--.  
Column 14, line 15, "invention, it" should read --invention. It--.

Column 16, line 45, "heaving" should read --having--.

Signed and Sealed this  
Eighteenth Day of December, 2012

David J. Kappos  
*Director of the United States Patent and Trademark Office*